US006263439B1

(12) United States Patent
Hondros et al.

(10) Patent No.: US 6,263,439 B1
(45) Date of Patent: Jul. 17, 2001

(54) VERIFICATION SYSTEM FOR NON-TRADITIONAL LEARNING OPERATIONS

(76) Inventors: John G. Hondros, 7728 Greensward Rd., New Albany, OH (US) 43154; Robert A. Wilson, 23320 W. 54TH St., Shawnee, KS (US) 66228; Ronald E. Hill, 1661 Bobwhite Trail, Stow, OH (US) 44224

(*) Notice: Subject to any disclaimer, the term of this patent is extended or adjusted under 35 U.S.C. 154(b) by 0 days.

(21) Appl. No.: 09/043,719

(22) PCT Filed: Aug. 27, 1997

(86) PCT No.: PCT/US97/15077

§ 371 Date: Feb. 9, 1999

§ 102(e) Date: Feb. 9, 1999

(87) PCT Pub. No.: WO98/09401

PCT Pub. Date: Mar. 5, 1998

Related U.S. Application Data
(60) Provisional application No. 60/024,627, filed on Aug. 27, 1996.

(51) Int. Cl.[7] ........................................... G06F 11/30
(52) U.S. Cl. ................................. 713/182; 713/183
(58) Field of Search ........................... 705/51, 52, 54–56, 705/57–59; 713/182–183; 709/204; 434/433

(56) References Cited

U.S. PATENT DOCUMENTS

| | | |
|---|---|---|
| H1452 | 6/1995 | Kennedy . |
| D. 367,872 | 3/1996 | Shinano . |
| 3,405,457 | 10/1968 | Bitzer . |
| 3,520,074 | 7/1970 | Severin et al. . |
| 3,718,986 | 3/1973 | Hewitt . |
| 3,774,316 | 11/1973 | Meier . |
| 3,782,007 | 1/1974 | Streit . |
| 3,909,959 | 10/1975 | Hesener . |
| 3,946,503 | 3/1976 | Buchan et al. . |
| 4,468,204 | 8/1984 | Scott et al. . |
| 4,793,813 | 12/1988 | Bitzer et al. . |
| 4,804,328 | 2/1989 | Barrabee . |

(List continued on next page.)

FOREIGN PATENT DOCUMENTS

| | | |
|---|---|---|
| 2-200053 | 8/1990 | (BF) . |
| 565685 | * 10/1993 | (EP) ................................ H04L/9/32 |

OTHER PUBLICATIONS

Oppliger et al. Distance education and on–line universities. Enabling Technologies: Infrastructure for Collaborative Enterprises, Proceedings of WET ICE. Jun. 1996. pp. 10–15.*

Davis, Michael J. Use of World Wide Web server and browser software to support a first–year medical physiology course. American Journal of Physiology. Jun. 1997.*

Primary Examiner—Thomas R. Peeso
(74) Attorney, Agent, or Firm—Oldham & Oldham Co., L.P.A.

(57) ABSTRACT

An audit and verification process (10, 20, 30, 40, 50, 60, 70, 80, 90, 100, 110, 120) is used to encode at least one personal identifier (70, 75) onto a media (80, 90) capable of interfacing with a personal computer, typically a floppy disk (80), encoding at least one password onto a viewable media, typically a videocassette (110) onto the floppy disk (80), displaying a prompt on a computer screen of the personal computer which requires a match of the at least one password from the videocassette (110) with the at least one password encoded on the floppy disk (80), storing multiple questions pertinent to a subject matter of the videocassette (110) on the floppy disk, displaying at least one question of the multiple questions on the computer screen of the personal computer and storing the answer to the at least one question on the floppy disk (120). The at least one password on the videocassette (100, 110) is preferably an audio password, but may include visual passwords as well as combinations.

35 Claims, 17 Drawing Sheets

U.S. PATENT DOCUMENTS

| | | |
|---|---|---|
| 4,820,167 | 4/1989 | Nobles et al. . |
| 4,930,019 | 5/1990 | Chu . |
| 4,967,354 | 10/1990 | Buchanan . |
| 4,991,208 | 2/1991 | Walker et al. . |
| 5,035,625 | 7/1991 | Munson et al. . |
| 5,065,429 * | 11/1991 | Lang ................................... 705/56 |
| 5,138,459 | 8/1992 | Roberts et al. . |
| 5,146,495 | 9/1992 | Son . |
| 5,159,633 | 10/1992 | Nakamura . |
| 5,199,068 * | 3/1993 | Cox ................................... 713/182 |
| 5,204,813 | 4/1993 | Samph et al. . |
| 5,211,564 | 5/1993 | Martinez et al. . |
| 5,228,859 | 7/1993 | Rowe . |
| 5,303,042 | 4/1994 | Lewis et al. . |
| 5,308,244 | 5/1994 | Hirose . |
| 5,421,730 | 6/1995 | Lasker, III et al. . |
| 5,440,631 | 8/1995 | Akiyama et al. . |
| 5,441,415 | 8/1995 | Lee et al. . |
| 5,450,489 | 9/1995 | Ostrover et al. . |
| 5,454,722 | 10/1995 | Holland et al. . |
| 5,458,494 | 10/1995 | Krohn et al. . |
| 5,700,149 * | 12/1997 | Johnson, III et al. ............... 434/322 |
| 5,774,525 * | 6/1998 | Kanevsky et al. ..................... 379/88 |
| 5,909,589 * | 6/1999 | Parker et al. ......................... 712/32 |
| 5,974,446 * | 10/1999 | Sonnenreich et al. ............... 709/204 |

* cited by examiner

VERIFICATION SYSTEM FOR NON-TRADITIONAL LEARNING OPERATIONS

This application claims benefit of Provisional Application 60/024,627 filed Aug. 27, 1996 and is a nation stage of PCT/US97/15,077 filed Aug. 27, 1997.

TECHNICAL FIELD

This invention relates to an electronic method and system for implementing the method which improves the efficiency and effectiveness of providing continuing education seminars while providing audit course registrant compliance and comprehension of the content material as well as verifying course registrant participation and attendance, thereby promoting the secure and controlled delivery of education materials directly to a registrant's home or place of work in a non-traditional electronic learning environment.

BACKGROUND OF THE INVENTION

Many professionals are required to earn continuing education credits within a time period defined by state accrediting agencies associated with each respective industry. Failure to meet these continuing education requirements can result in suspension of an individual's professional license.

Accrediting agencies typically authorize selected public or private organizations to serve as providers or program sponsors in designated geographic areas. It is the responsibility of each provider to submit proposed programs to the accrediting agency for approval. Accrediting agencies examine the content of these programs and usually approve or disapprove them within thirty days from the date of submission.

Once the programs have been approved, the providers are free to publicize the availability of a seminar to any and all industry professionals in the state. Program seminars are currently being presented to fee paying course registrants who attend traditional, typically live, classroom events. At the conclusion of each seminar, a provider representative or monitor signs documentation which verifies registrant attendance at the continuing education event. The provider then notifies the state accrediting agency that the registrant has earned continuing education credits. The provider and the accrediting agency track the industry professionals' continuing education seminar activity until the appropriate number of credits have been earned.

While industry providers have been offering continuing education seminars in this traditional manner to state professionals for many years, increasingly, providers are seeking new solutions to a myriad of challenges, including rising operating costs, over-sized resources from faculty to physical plant, and growing competition for the student pool. At the same time, technological advances in electronic delivery have made learning in the home and workplace more versatile and cost-effective than ever. The dynamic nature of the technology industry, coupled with provider needs for increased business efficiencies has created a situation requiring new partnerships which can dramatically transform the way learning is effected. Changing social, economic and demographic trends associated with end-user course registrants make issues of convenient course accessibility, viewing flexibility, and affordability critical to future provider plans to implement alternative methods of delivering continuing education seminars.

Through the audit and verification system which will be described, professionals are able to view approved programs provided through a videotape library service while simultaneously responding to personalized information encrypted on the accompanying audit verification tool. Registering and participating in electronically delivered continuing education seminars frees the professional to conduct business during normal, daytime hours when clients and associates need to access their services.

SUMMARY OF THE INVENTION

The audit and verification system is a cost-effective method for distributed learning by participants, particularly suitable in settings where the participant is not capable of attending traditional classroom settings. The system permits learning to progress at the pace of the participant while still providing audit and verification capabilities that the participant is the same as the registrant. These capabilities are provided by the inclusion of audio and/or visual password(s) in each videocassette segment. These password(s) or embedded indicia must be entered onto computer disks provided by the course provider, such disks having been encrypted with biographic information supplied by the registrant and personal identifier information supplied by the registrant. The participant must be capable of matching both the biographic information as well as the personal identifier information for the audit and verification system to proceed. Subsequent to the entry of this user-specific information, the participant is required to respond to a bank of generated questions which test the comprehension of the participant of the viewed material. The system is capable of analyzing the answers which have been input by the participant and instant feedback is provided. The system is capable of requiring a predefined level of competence of the subject matter be achieved by the participant prior to indicating that sufficient mastery of the subject matter has been demonstrated. This predefined level of competence is set by the appropriate state accrediting agency.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DESCRIPTION OF THE PREFERRED EMBODIMENTS

This invention will now be described in detail with referenced to preferred embodiments thereof In brief, the audit and verification system is a method which permits state accrediting agencies to insure that professionals which the agency has oversight responsibility thereover, effective maintain their skill levels at high levels through effective continuing education.

Videocassette & Floppy Disk Version

Figure 1:
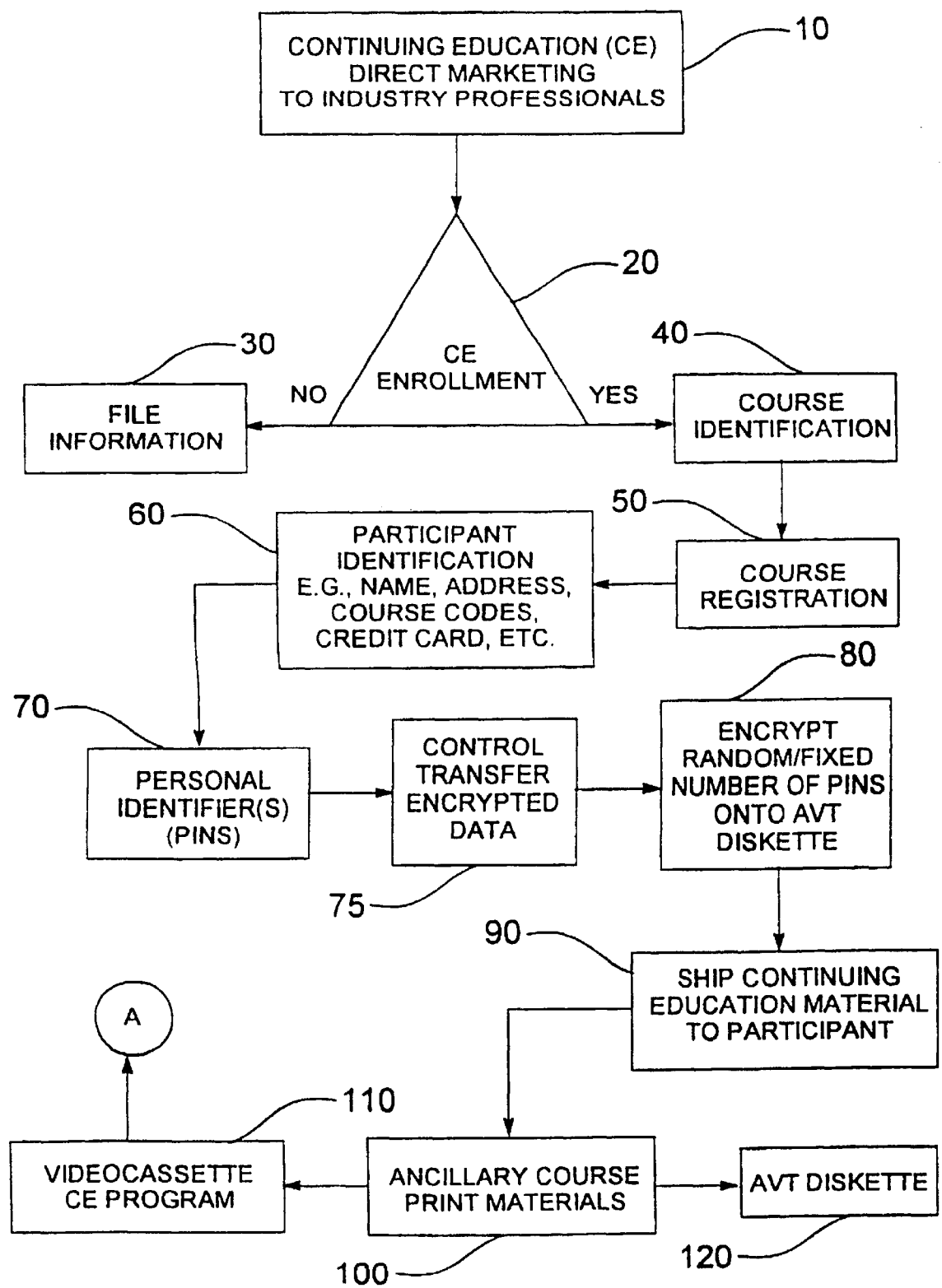
FIG. 1 is a flowchart of the continuing education course registration and product distribution.

As seen in FIG. 1, the continuing education course 10 is marketed to industry professionals in various ways. This may entail direct mailings, advertisements in publications of interest to the targeted professional, incorporation into trade journals, and other well-known mechanisms known in the art. It is recognized that the continuing education course would preferably have been pre-approved by the appropriate state accrediting agency to insure that the professional would receive continuing education credit subsequent to participation in the continuing education course. The targeted professional reviews 20 the promotional material, which may contain various topics, and decides whether the subject matter of any of the listed continuing education seminars 10 is of interest. If the professional decides that the topics are not of immediate interest, but may be of interest in the future, he files the information 30 in a manner which would permit retrieval at a later date. However, if there is information which is of interest, then upon identification of the pertinent course or courses 40, he contacts the course supplier. The nature of this contact may typically be via telephone 50 (generally using a toll-free telephone number) or electronically, via for example, a web site established by the course provider. As advances continue to be made in telephone conversations over the Internet, this conversation with the course provider may be made using telephone links over the Internet. During this contact with the course supplier, the participant would provide various biographic pieces of information 70 to permit mailing of the information to the participant as well as several (e.g., 1 to 20) personal identifiers which are unique to each participant. Each accrediting entity can establish their own identifiers, which should be personal data that can be verified. In a preferred embodiment of the invention, the participant will provide more than one personal identifier to insure a statistically significant level of "uniqueness" is present for each participant. A non-limiting list of exemplary personal identifiers would include for example, credit card numbers, maiden name of participant's mother, maiden name of participant's wife, license plate numbers, participant's birth city, birth city of participant's mother, birth city of participant's wife, credit card information, professional license number, etc. This information will be used later in the process to restrict entry into the Audit & Verification Tool, (AVT) student module. Basic input validation techniques are used to verify that the course selected is a valid course. Other fields are validated as much as possible to insure that the fields are valid, the techniques including field length, legal characters, and any other validation appropriate to the input field.

In addition to the biographic information and personal identification information, the participant is required to provide a minimum amount of information about the computer system which is necessary to insure audit and verification compliance. This information would include at a minimum, the type of computer, (i.e., IBM, IBM-compatible, Macintosh); and the computer operating system (e.g., DOS®, Windows® 3.1x, Windows® 95, Windows® NT, UNIX®). Optionally, if the participant is knowledgeable regarding the specifics of the computer system, information regarding the floppy disk drive size (e.g., 3.5", 5.25"); the amount of RAM (Random Access Memory, e.g., 16 MB, 32 MB, 64 MB, 128 MB); processor generation (e.g., 80286, 80386, 80486, 80586, 80686, pentium, MMX); processor speed (e.g., 33 MHz, 66 MHz, 90 MHz, 120 MHz, 133 MHz, 166, MHz, 200 MHz, 266 MHz); existence of a co-processor (e.g., math co-processor); hard disk capacity (e.g., 200 MB, 400 MB, 600 MB, 1 GB, 2 GB, 4.3 GB, 6.4 GB, etc.); existence of a sound card; existence of a CD-ROM and the speed thereof (e.g., 2×, 4×, 6×, 8×, 16×, 32×); and Internet access (e.g., via modem at 14.4K, 28.8K, or 56K, ISDN connection, T1 line) may be provided.

A random or predetermined number of these personal identifiers are then encrypted 80 onto a floppy disk (AVT student disk 120) which is mailed 90 to the course registrant pursuant to the information 60 which has been previously provided in addition to a videocassette tape 110 which contains the continuing education program. This diskette would be appropriate for the computer identified by the participant during the contact with the course provider.

Figure 1A:
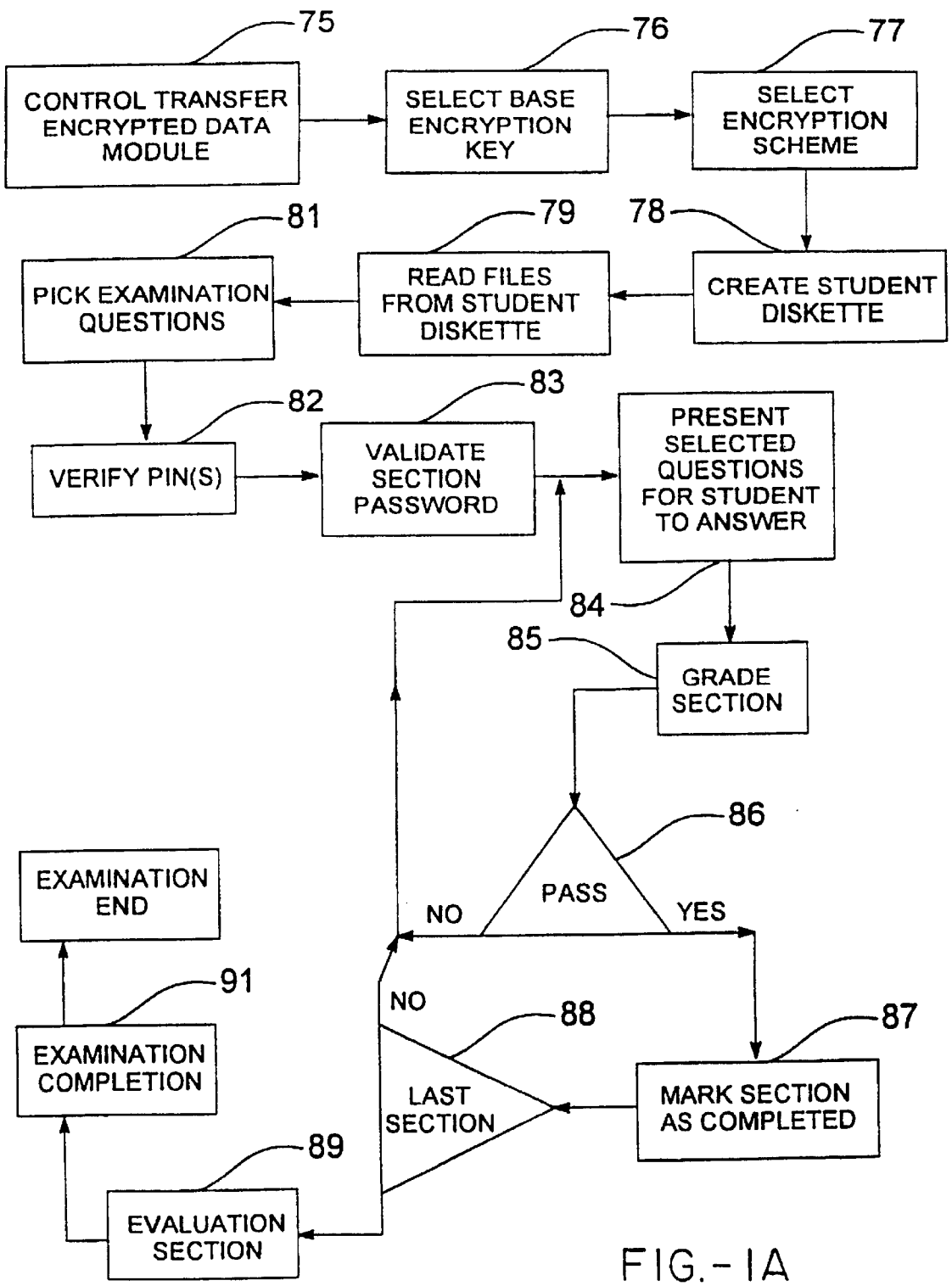
FIG. 1A is a flowchart of the encryption aspects of the diskette preparation and distribution.

The encryption process utilized will now be described in detail in association with FIG. 1A. During the encryption process 75, an encryption key 76 is selected, which is typically a number of at least six characters in length. It is recognized that the longer the key, the harder it will be to break the encryption algorithm. This key is called the base key and is used to compute the other keys in the program. Each student disk is built using a different random base key, thereby ensuring the uniqueness of each disk.

Each question on the disk is encrypted using a different computed key. This key is routinely changed using a mathematical formula with the question number, section number, date-created, social security number, credit card number, expiration date, and any other numeric value as potential variables in the calculation. The encryption scheme identification 77 specifies which mathematical formula to use when encrypting or decrypting questions. There can be any number of formulas built into the registration module. The use of a base key with computed keys derived from multiple algorithms helps to ensure the integrity of the examination. In one embodiment of the invention, this encryption scheme is extended to rotate among several algorithms with the test using the encryption scheme identification as the starting point. This encryption scheme is not limited to numeric sequences, and may include the incorporation of alphabetical information as well. In one embodiment of this invention, a combination of alphanumeric information is used in the encryption scheme. The key is to have coordination between the encrypting program (the registration program) and the decrypting program (the student module). The encryption scheme identification allows the program to change over time, again ensuring the integrity of the examination.

The base encryption key, encryption scheme identification and personal identifiers are encrypted using a starting key. These encrypted values are written in data files on the student disk 78. For simplicity and ease of implementation, the starting key is typically hard-coded within the registration program and student module, although this is not a necessary requirement, and easily could be varied if appropriate. Using the base encryption key and a formula specified by the encryption scheme identification, the question database for the selected course is built and copied onto a disk. Included in the question database are the number of questions to pick in each section and what the percentage of correct answers are necessary to pass each section. The questions can be multiple choice, yes/no, or true/false. An entry is made in the registration database and a label is created.

Continuing with the entire process of encryption/decryption, from start to finish, the base encryption key, encryption scheme identification and personal identifiers are decrypted using the starting key 79, which is typically hard-coded in the student module program. A series of tables are generated and built which are used to speed access to data in the examination. Questions are encrypted with computed keys which are derived using formulas specified by the encryption scheme identification.

On first entry into the examination 81, the required number of questions are randomly picked from each section. The questions selected are marked so that the same questions are selected on subsequent entries into the program. In order to gain entry to the test, the user must correctly match the information provided at registration 82. The first time the student enters the program, typically all the identifiers must be correctly matched. Subsequent entries into the program are typically verified by a subset of the personal identifiers.

Entry into each examination section is protected by a password 83 communicated to the student generally in the audio track of the video. Depending on the needs of the accrediting entity, these passwords can vary for each student or can be standardized for each course video. The student answers the randomly selected questions 84. Facilities are provided to allow the user to navigate back and forth through the questions in a section. However, once a section is passed, the user is not allowed to go back. Each section must be successfully completed before the student is allowed to progress to the next section.

Part of the information encrypted in the question database are the correct answers 85. The answers to the selected question are compared to the answers provided. The percentage of correct responses is then computed. Encrypted along with the questions and answers, is the percentage of correct answers required to pass the section 86. The student must continue working on a section until the requisite passing percentage is attained. Once this percentage has been achieved, the section is marked as completed and the student is not allowed back. Progress is allowed in a forward direction only. Successful completion of a section will result in that section being marked as complete and time-stamped with the date/time completed 87. This information is extracted when the disk is returned to the registration center.

After the completion of the entire course 88, allowing for a re-entry into the process depending upon the number of sections in the course, an evaluation section 89 is required to be completed comprised of questions requested by the accrediting entity to gather statistics on the course and examination. Provision is made in the evaluation section to allow text entry of answers so that opinions and suggestions may be entered. The student is notified of successful completion 91 of the examination and is referred to the written instructions provided with the video and student disk that describe the process to return the materials to the registration center to be awarded credit.

From a student perspective, and returning to the flow chart in FIG. 1, after successful encryption of the appropriate materials have been effected, these materials, including a videocassette 110 of the continuing education program and AVT disk 120 created above, are sent 90 to the course registrant who would couple this with any ancillary course print materials 100 which may have been mailed to the course registrant.

Figure 2:
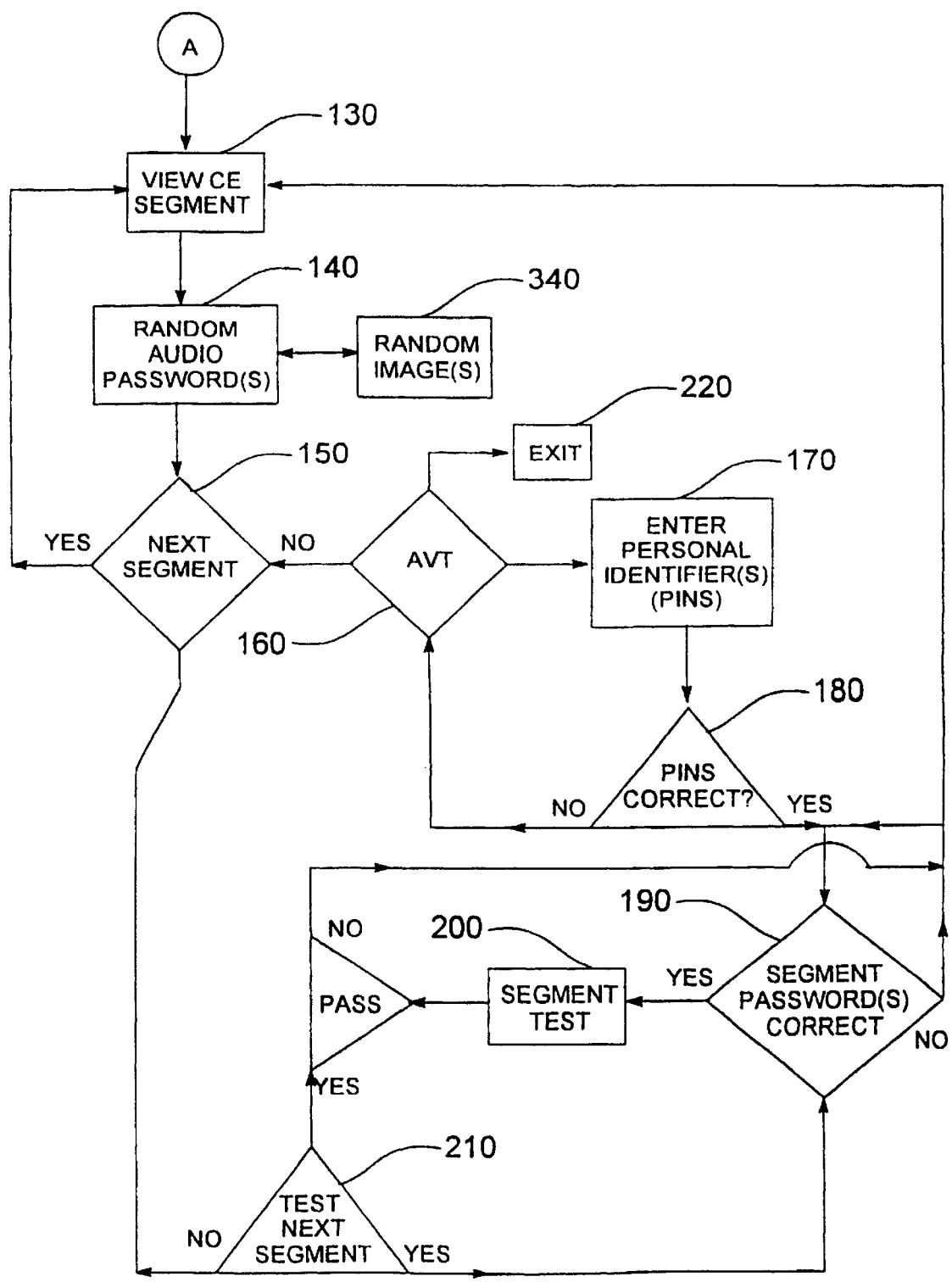
FIG. 2 is a schematic of the continuing education required participant activities.

Upon receipt of the course materials, the registrant would be required to complete the viewing and generation of required responses which are contained on the AVT disk within a predetermined amount of time. This time may range from one week to one month or more. Failure to complete and return the materials including the AVT disk within the required period of time would result in the participant not receiving continuing education credit from the appropriate state accrediting agency. As shown in FIG. 2, the participant will generally view a continuing education segment 130 which is contained on the videocassette. The videocassette may contain as few as one segment or session (of generally 40 minutes to one hour in duration), or may contain multiple segments or sessions which may span several videocassettes. During the viewing of any one segment contained on the videocassette, and at randomized locations within the segment, at least one, and possibly two or more audio or visual passwords or other indicia or combinations thereof 140 will either be spoken or visually presented on the television screen. The participant will be required to jot down these indicia for later use in responding to the questions on the AVT disk. In a preferred embodiment of the invention, the passwords or other indicia will be contained in the audio track of the tape rather than on the visual track. This will prohibit the participant from "fast forwarding" through segments of the videocassette and simply looking for visual indicia on the screen, and will require a complete listening to the entire segment.

After the completion of the viewing of the first segment, the participant will have the option to continue with the next segment of the program, if the program has two or more segments. If the participant elects to continue viewing the program, this second segment will have at least one, and possibly two or more, audio or visual passwords or other indicia or combinations thereof 140 which will be either spoken or visually presented on the television screen as discussed previously. These indicia may be unique from those contained in the first segment. After completion of the second segment, and if appropriate, the participant will have the option to continue with another segment of the program if another segment is contained within the course, or he will begin the AVT phase 160 of the process.

During the AVT phase 160, the participant will insert the AVT disk, either 3.5" or 5.25", into the floppy disk drive (either drive A: or drive B:) into the computer, the AVT disk being matched to the operating system of the participant's computer. The participant will install the software locally on the computer. During the installation process, and depending upon the sophistication of the end-user, a default installation will be performed which will install the software on drive C:, or a customized installation will be implemented where the end-user will have the option of installing the software to a logical drive, e.g., D:, E:, etc.

In order to insure that the participant is in fact, the individual who registered for the course, the participant will be required to enter various personal identification information, such as was provided previously 70 during the registration process and a random number of which, or a predetermined number of which, was encoded 80 onto the AVT disk. Upon entry by the participant of the requested personal identification information 170, it is checked against the encoded AVT information 180 for an exact match of characters. This checking process is generally case insensitive. If the entered information does not match the encoded information 180, the participant is permitted to re-enter the information. If this information does match, then the participant is required to enter the at least one segment password 190 which was either spoken or visually presented on the viewing screen. If a mis-match of the segment password which was entered by the participant is detected, the participant is permitted to re-enter the password or to review the continuing education segment 130 paying closer attention to the randomized audio or visual indicia (password(s)) which are present on that segment 140. If the participant can correctly enter the segment password(s), then the participant is required to demonstrate his understanding of the subject matter of the presentation by taking a test 200 which generally contains various multiple-choice type questions. In order to demonstrate proficiency of the subject matter, the participant is generally required to correctly answer a pre-defined number of questions, this predefined number being set by the appropriate state accrediting agency. If the participant is not able to correctly answer a sufficient number of questions, he is permitted to either retake the examination or to review the continuing education segment 130 followed by retaking the test to demonstrate his proficiency. The questions presented for this second test may or may not be the same questions as the participant saw on the first examination. In a preferred embodiment, each test is generated in a randomized fashion from a master set of questions present on the disk.

If the participant is successful in passing the examination pertinent to the segment, the option is available to continue taking the examination associated with the next segment 210. As discussed previously with the first segment, the participant is required to correctly identify the segment password(s) 190 correctly before being allowed to begin the testing process for the next segment of the continuing education program, thereby insuring that the participant did view the segment. If the participant has not viewed the next segment, the participant would begin to view the next continuing education segment 150 on the videocassette and continue with the program 130 as was described previously. Upon the successful viewing of this second segment, and provided that the computer which contains the AVT diskette has not been turned off, the participant is permitted to skip the entering of the AVT personal identification passwords 170 and would enter the process at the entry of the appropriate segment password(s) 190. Upon completion of the successful entry of the segment password(s) 190 and the passing of the segment test 200, the participant would exit the AVT computer phase of the process 220.

Figure 3:
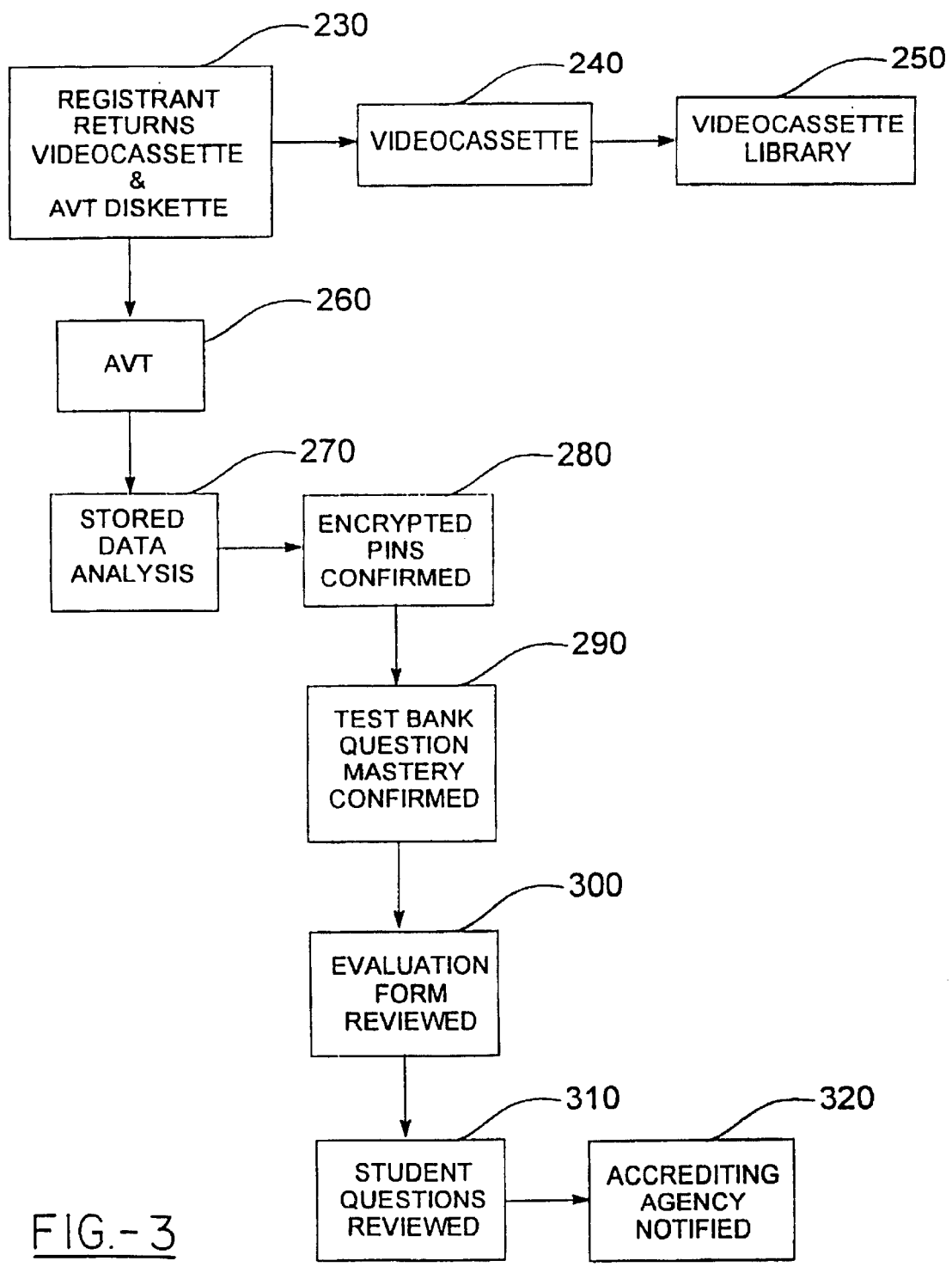
FIG. 3 is a schematic of the continuing education audit, verification, assessment and certification.

In FIG. 3, upon the completion of the continuing education course and correctly answering of the questions during the AVT phase of the process, the participant would return the videocassette(s) and AVT disk 230 to the course provider. The returned videocassette 240 would be shelved in the videocassette library 250 for use by a future second requestor. The AVT disk 260 would be analyzed 270 to determine that the encrypted personal identifiers did match the inputted response 280 and that the questions were correctly answered at least to the predetermined level of proficiency required by the state accrediting agency. If appropriate, an evaluation form is printed and reviewed 300 as well as any student generated questions 310 for instructor review and response if appropriate. The state accrediting agency is notified 320 regarding the completion of the course by the participant and the participant granted certification for the appropriate number of continuing education credits.

By following the above sequence of steps, it is possible to audit and verify compliance with state agency accrediting requirements in a cost-effective manner and yet in a non-traditional environment. The high cost and inconvenience of centralized teaching locations is eliminated, thereby permitting more flexible learning times for the course participants.

By way of example only, and for the purposes of complying with the best mode known by the applicants as determined by the date of the filing of this application, a pictorial representation of the computer screens which would be seen by a course participant are shown. These screens are by way of example only and are not intended in any way, to teach the reader any subject matter which may be disclosed by the examples, the presented information being fictitious in nature and for illustrative purposes only.

Figure 4:
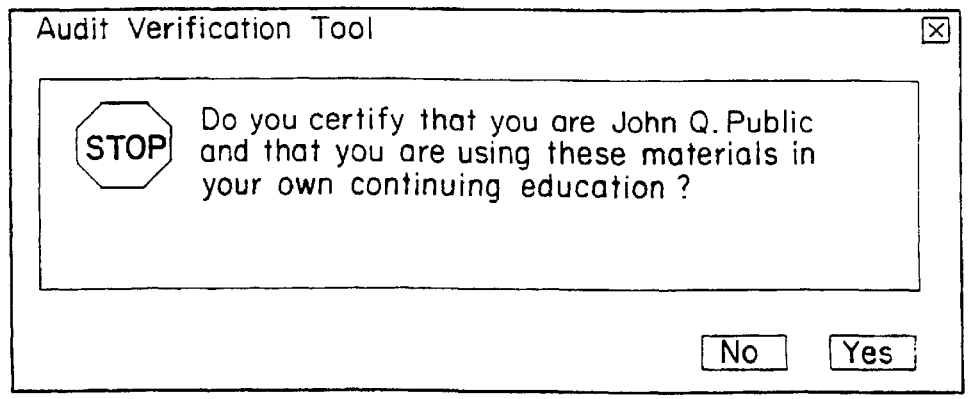
FIG. 4 is an exemplary initial computer screen display after activation of the AVT module.
Figure 5:
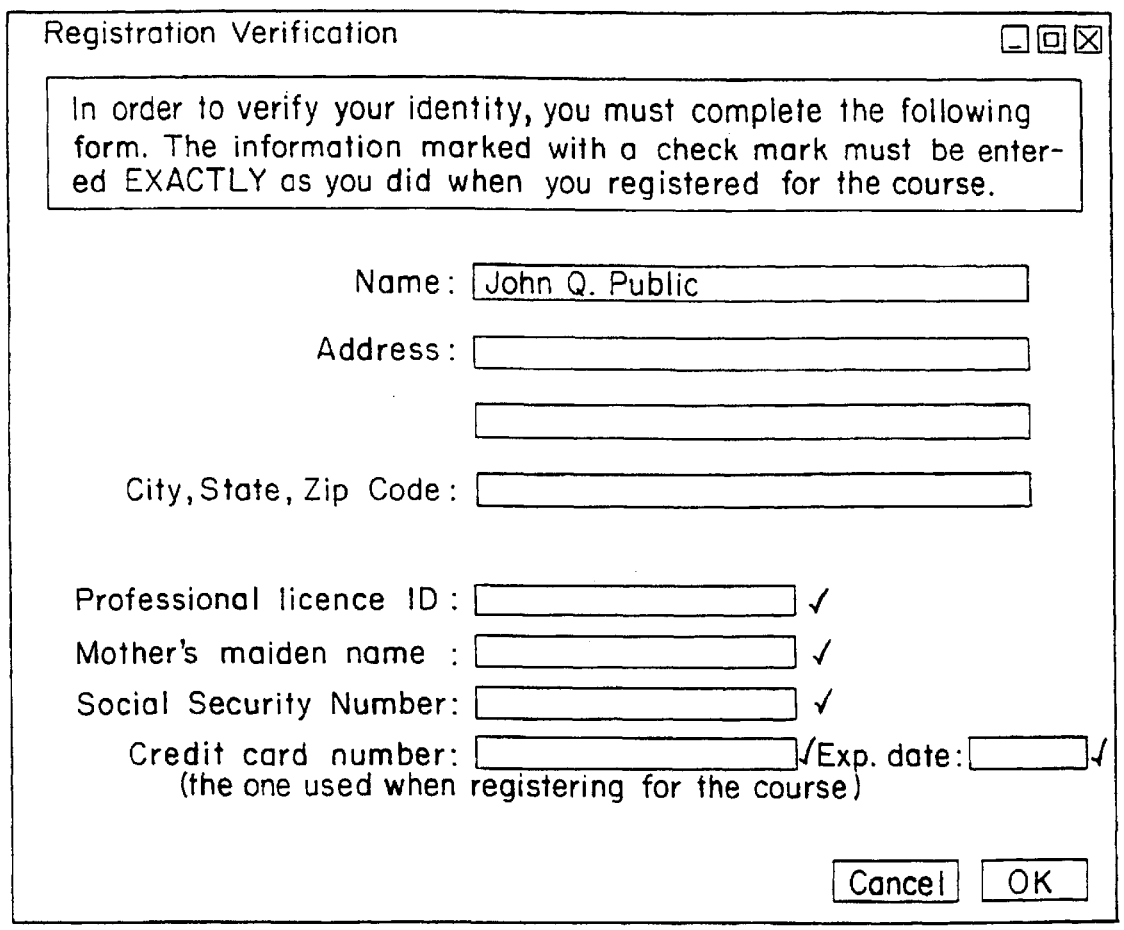
FIG. 5 is an exemplary computer screen display showing the information fields which must be entered by the participant.

Upon the entry into the AVT system and shown in FIG. 4, the participant is asked to verify that he is the course requestor as identified in section 60 of FIG. 1. The default response is "NO" thereby requiring a positive step be taken by the participant. A second verification screen is shown in FIG. 5, wherein the participant is asked to re-input the biographic information as well as personal identifier(s) which were provided to the course provider during the registration process identified in sections 60 and 70 of FIG. 1. In order to aid in the state accrediting agency, the professional license number of the participant is requested if pertinent, as well as various unique personal identifier information, e.g., mother's maiden name, the social security number of the participant and the credit card number and expiration date used when registering and paying for the course.

Figure 6:
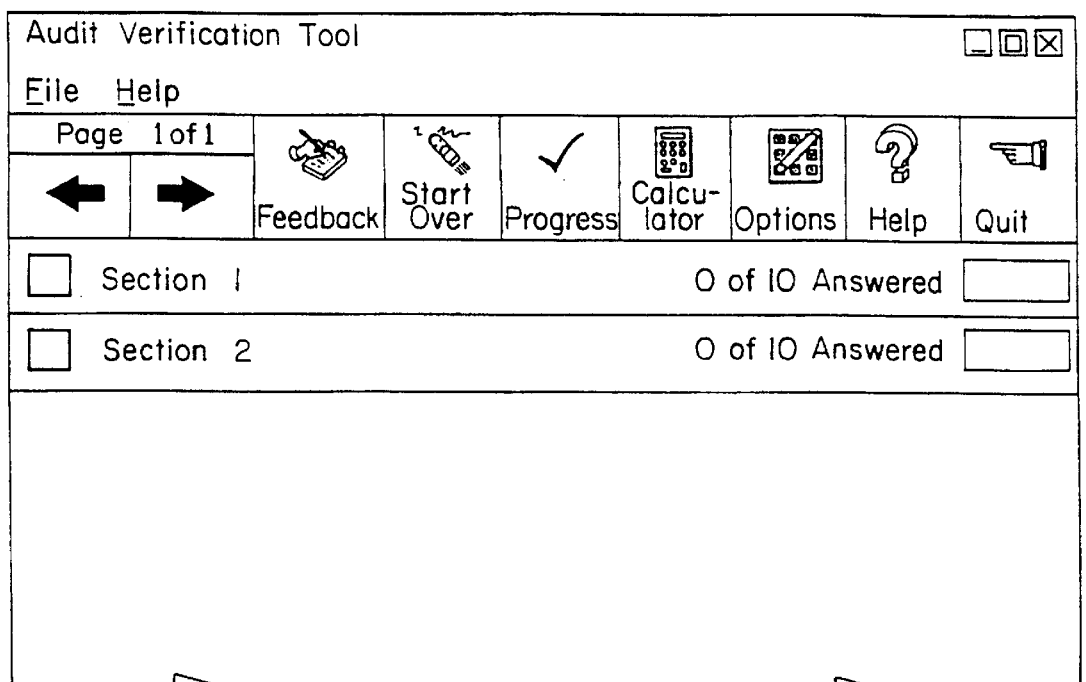
FIG. 6 is an exemplary computer screen display showing a summary page of a two segment continuing education course.
Figure 7:
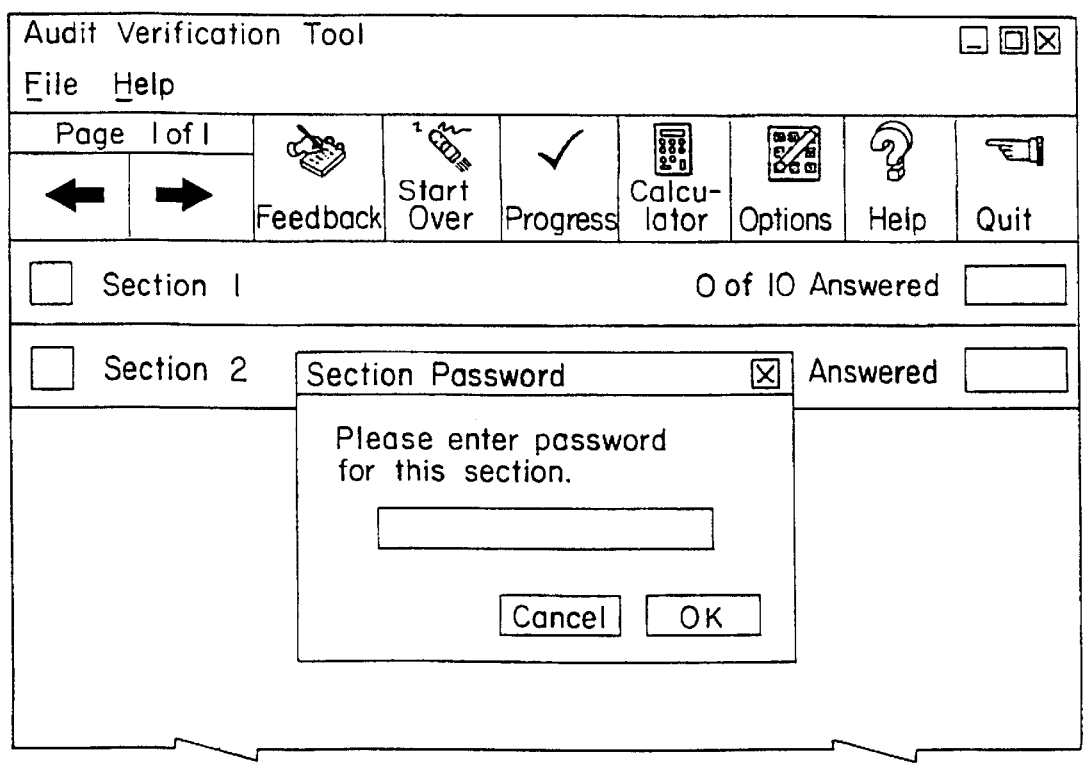
FIG. 7 is an exemplary computer screen display which shows a subscreen which requires the participant to correctly enter the password for this section.
Figure 8:
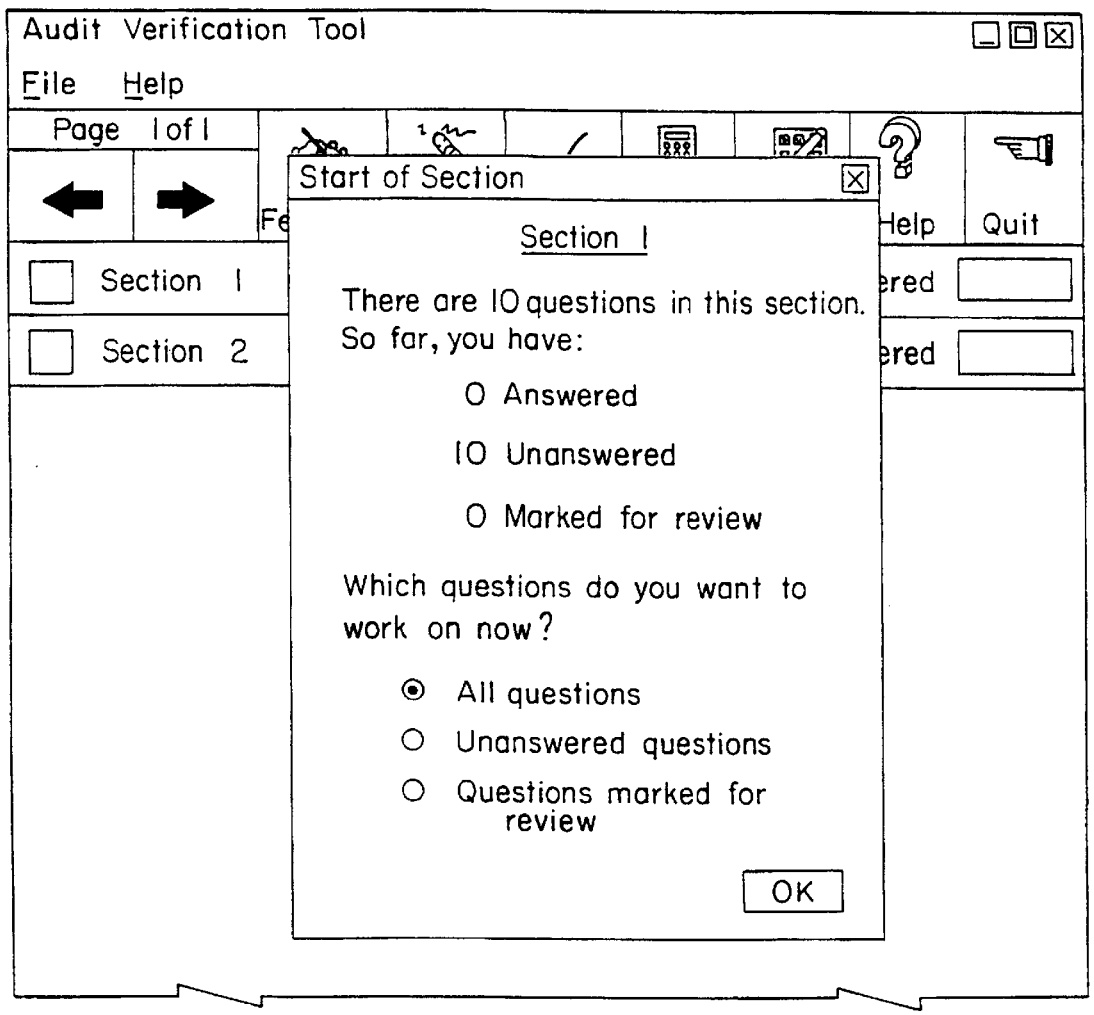
FIG. 8 is an exemplary computer screen display which summarizes the progress made in the first segment of the continuing education course.

As seen in FIG. 6, a two segment course is indicated containing section 1 and section 2 and further indicating that none of the ten questions pertinent to sections 1 or 2 have been answered at this point. The participant has various options available, each of which will be discussed in turn, but include providing "Feedback" to the course provider; starting over; measuring progress, using a calculator if appropriate for the course material; user customization options; help; and "Quit" functionality. Upon the highlighting of section 1 of the AVT component, the participant is prompted for the password(s) which are associated with this section. In the example, only one password was mentioned during the first section or segment. In other continuing education programs, it is recognized that several passwords may be required to be entered. As indicated previously, the password(s) will generally be audio password(s) or other audio indicia, although it is possible that some visual indicia may be present or combinations thereof Upon the successful match of the entry of the password(s) associated with the viewed segment with the encoded password(s) on the AVT disk, the user is shown that there are ten (10) questions contained in the first section and that none have been answered or marked for review. The participant is requested to respond to answer all questions for this section.

Figure 9:
FIG. 9 is an exemplary computer screen display which shows a sample test question with four possible answers.
Figure 10:
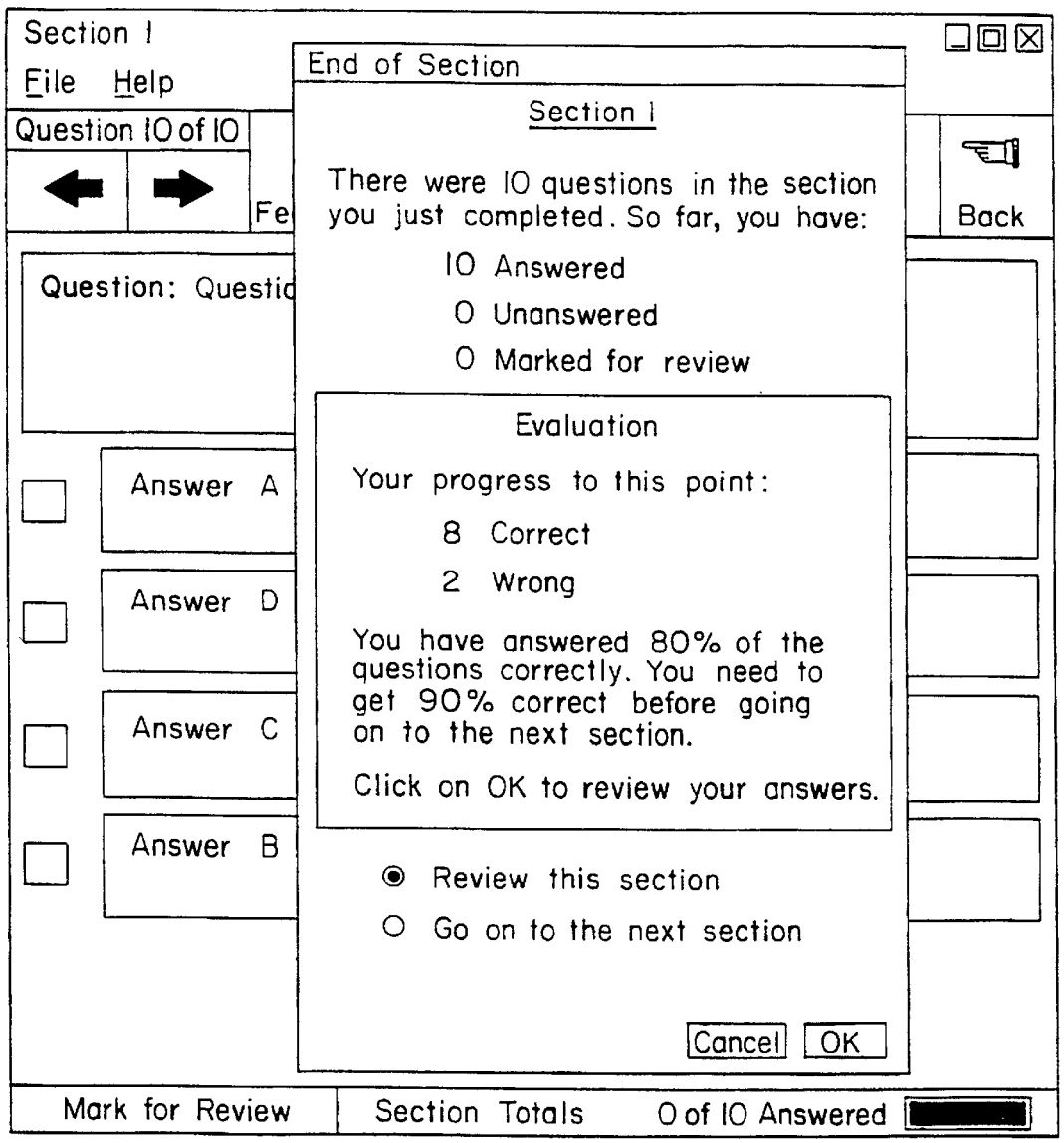
FIG. 10 is an exemplary computer screen display after the participant has answered all questions associated with the first segment and evaluation of the progress of the participant.

FIG. 9 shows a sample first question for this first section pertinent to taxation of property to a surviving spouse with four multiple choice answers. The participant is provided with the option of either answering the question by using the mouse to click on the button associated with the answer deemed to be correct by the participant or to mark the question for review later. Upon either answering the question or marking it for later review, the participant can go to the next question, or move the next section, if a next section was contained in the program. If necessary, the participant has an electronic calculator available as well as the ability to go back to the previous computer screen. FIG. 10 is exemplary of the display which the participant would see after the completion of all ten questions. The AVT component would have checked for the correct response and in this example, it was determined that the participant correctly entered 8 responses while incorrectly entering 2 responses. In this hypothetical example, the state accrediting agency had indicated to the course provider that a minimum of 90% of the questions must be answered correctly before the participant would receive credit for the continuing education course. Therefore, it would be possible for the participant to review this section on the videocassette and retake the examination or to try to answer the questions on the second section prior to reviewing the course material and retaking the pertinent examinations associated with each segment. If the participant is successful in passing a segment of the program, then it is not necessary for him to retake that segment's examination a second time.

Figure 11:
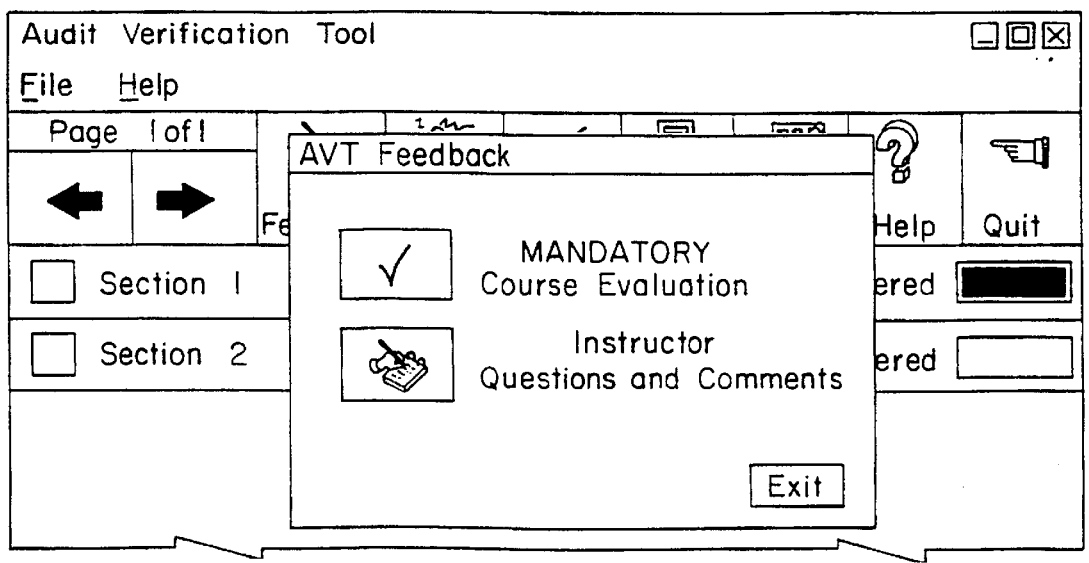
FIG. 11 is an exemplary computer screen display showing a feedback option.
Figure 12:
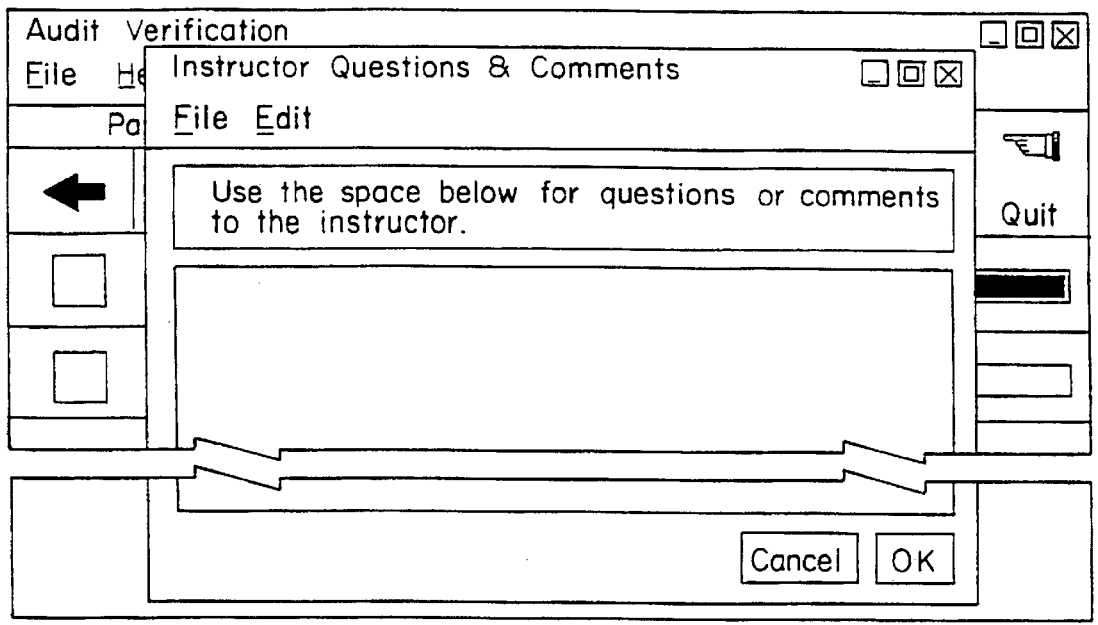
FIG. 12 is an exemplary computer screen display showing a notepad for entry of questions or comments to the course instructor.

FIG. 11 indicates that there is a mandatory course evaluation associated with this continuing education seminar and would be required to be completed for the participant to receive continuing education credits from the state accrediting agency. An option is also provided to the student for "Instructor Questions and Comments" and is a rudimentary notepad word processing editor, FIG. 12, that the participant may use in preparing the comments.

Figure 13:
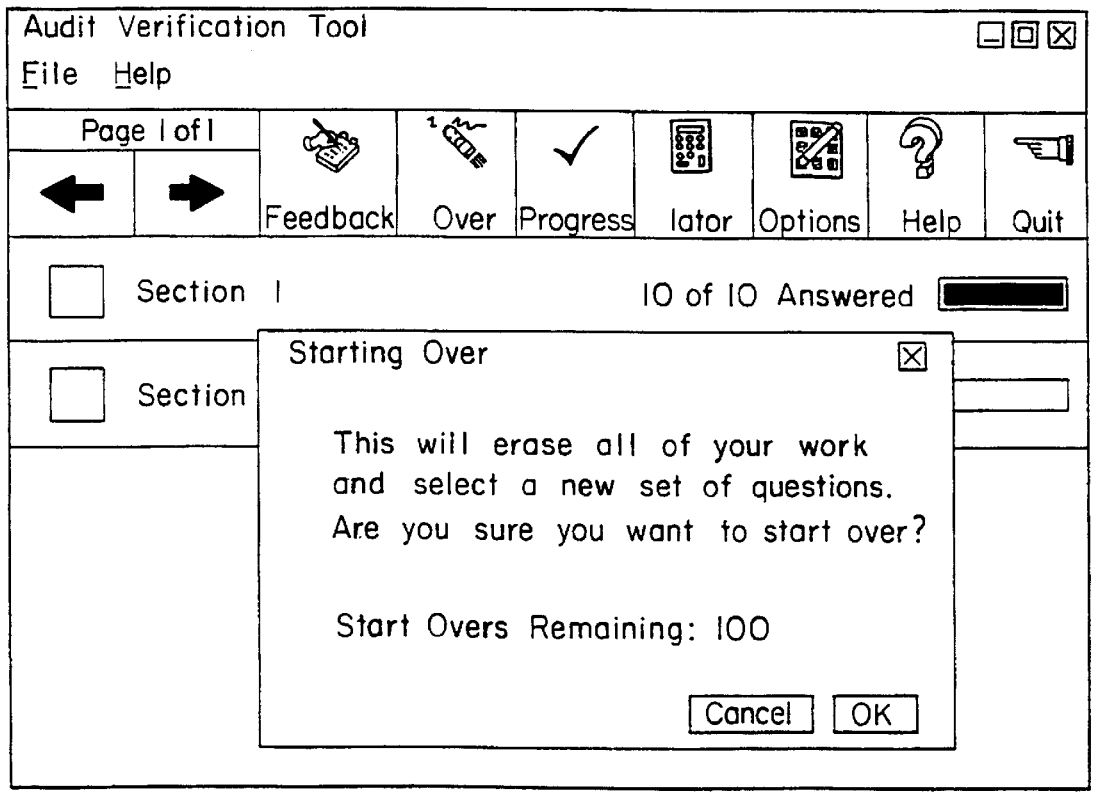
FIG. 13 is an exemplary computer screen display showing an option for the participant to start the program over.
Figure 14:
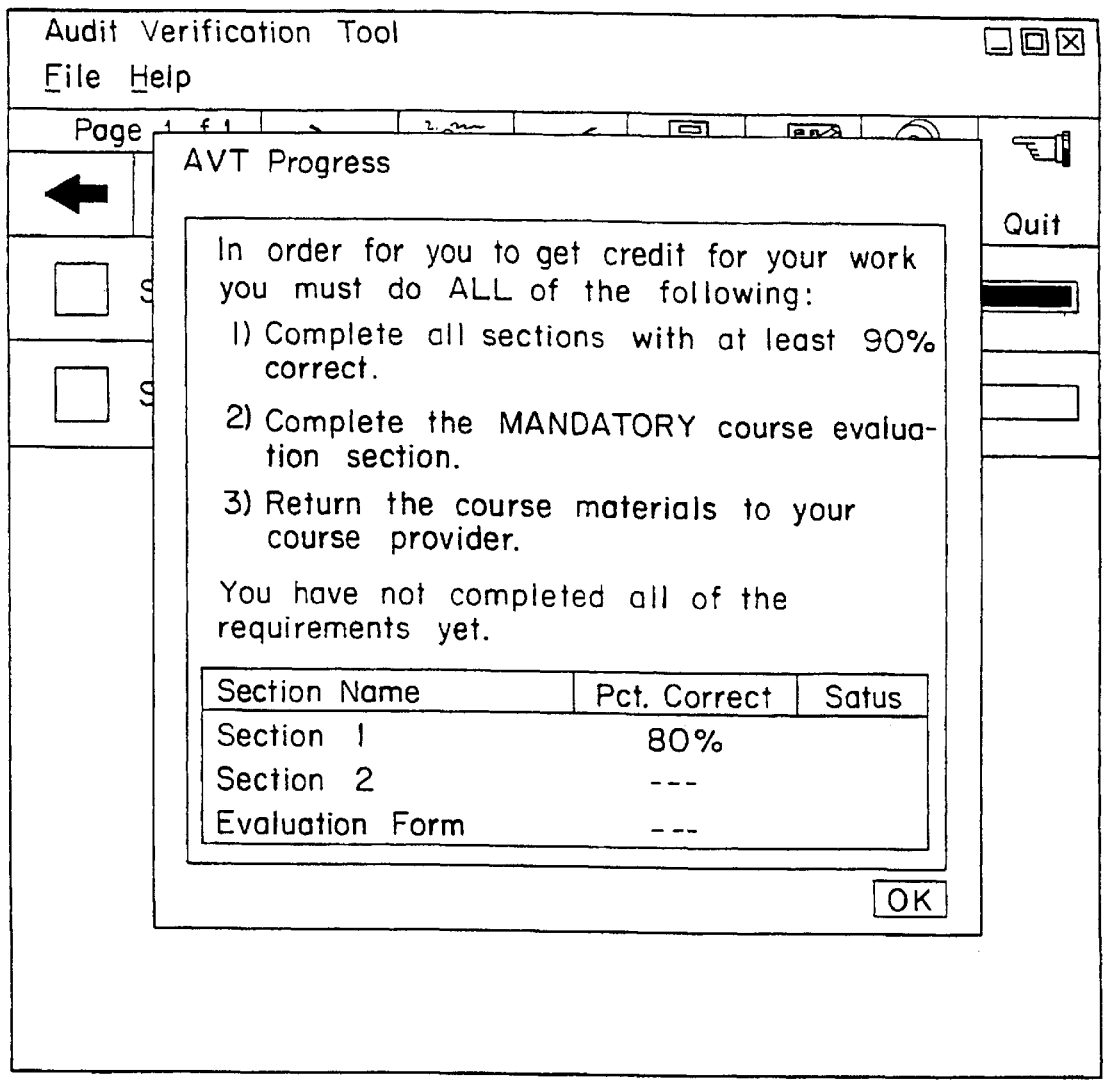
FIG. 14 is an exemplary computer screen display showing an overall AVT progress report.
Figure 15:
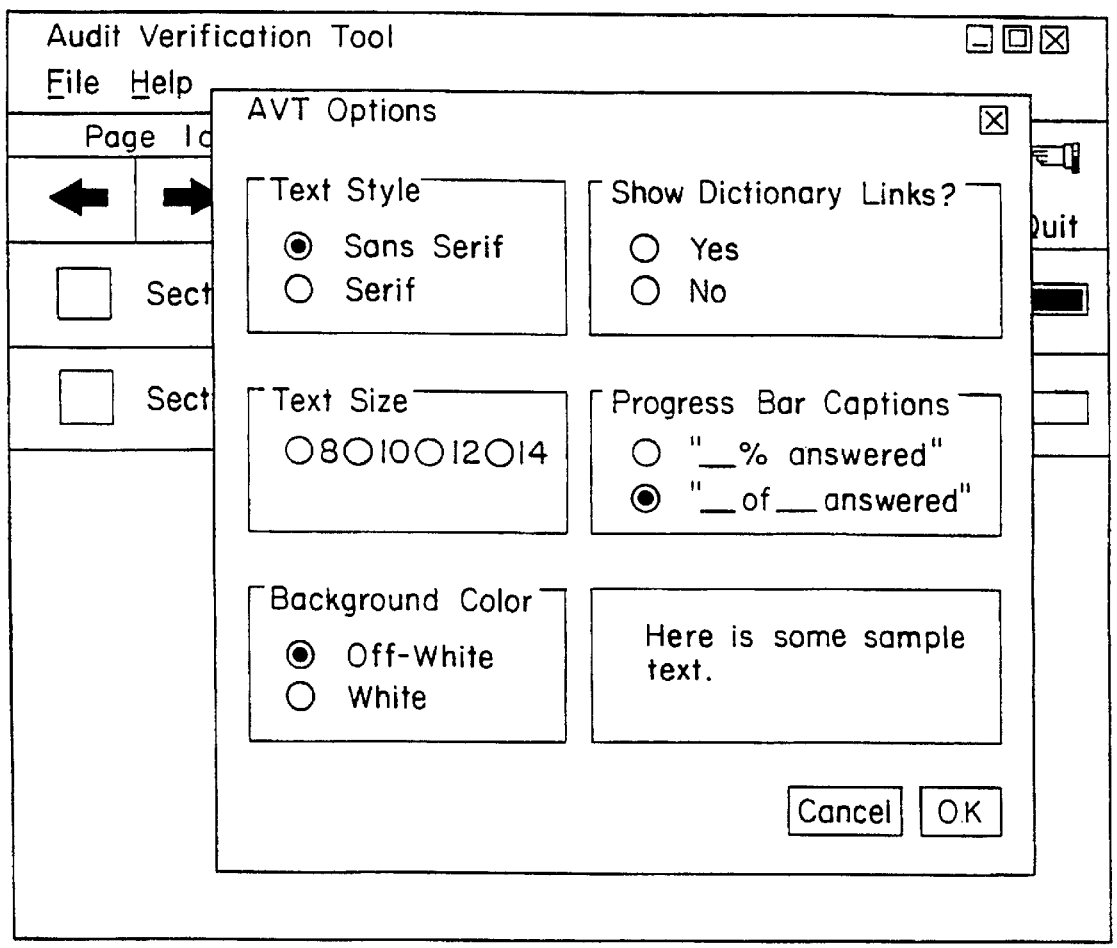
FIG. 15 is an exemplary computer screen showing customization options.

FIG. 13 illustrates the ability of the student to retake the examination associated with the failed section. Typically, this section will contain new questions different from those presented initially to the student, although there may be some overlap in the questions depending on the size of the bank of questions contained on the disk and the subject matter of the course. A predefined number of restarts is permitted for each course program. FIG. 14 is a progress screen which would be displayed by pressing the "Progress" button described in association with FIG. 6. In this hypothetical example, the student completed 8 out of 10 questions correctly in the first section of the course, did not take the examination associated with the second part of the course and did not complete the evaluation form. FIG. 15 illustrates some of the customizable parameters which are available to the participant by pressing the "Options" button described in association with FIG. 6.

Videocassette & Floppy Disk & Audiocassette Version

In one alternative embodiment of the invention, a further level of security is added to the system by the substitution of an audio cassette which the participant is required to utilize and respond to several test bank questions which have been generated pertinent to the viewed segment of the course. The participant will record his responses directly onto the audio cassette provided. When all questions responses have been successfully recorded, the audio cassette, computer disk and video cassette are returned to the course provider who matches the audio cassette to that of previously articulated responses of the participant to the course provider during the registration call 50 wherein various recorded biographical information 60 and personal identification information 70 had been provided.

CD-ROM Version

Figure 1B:
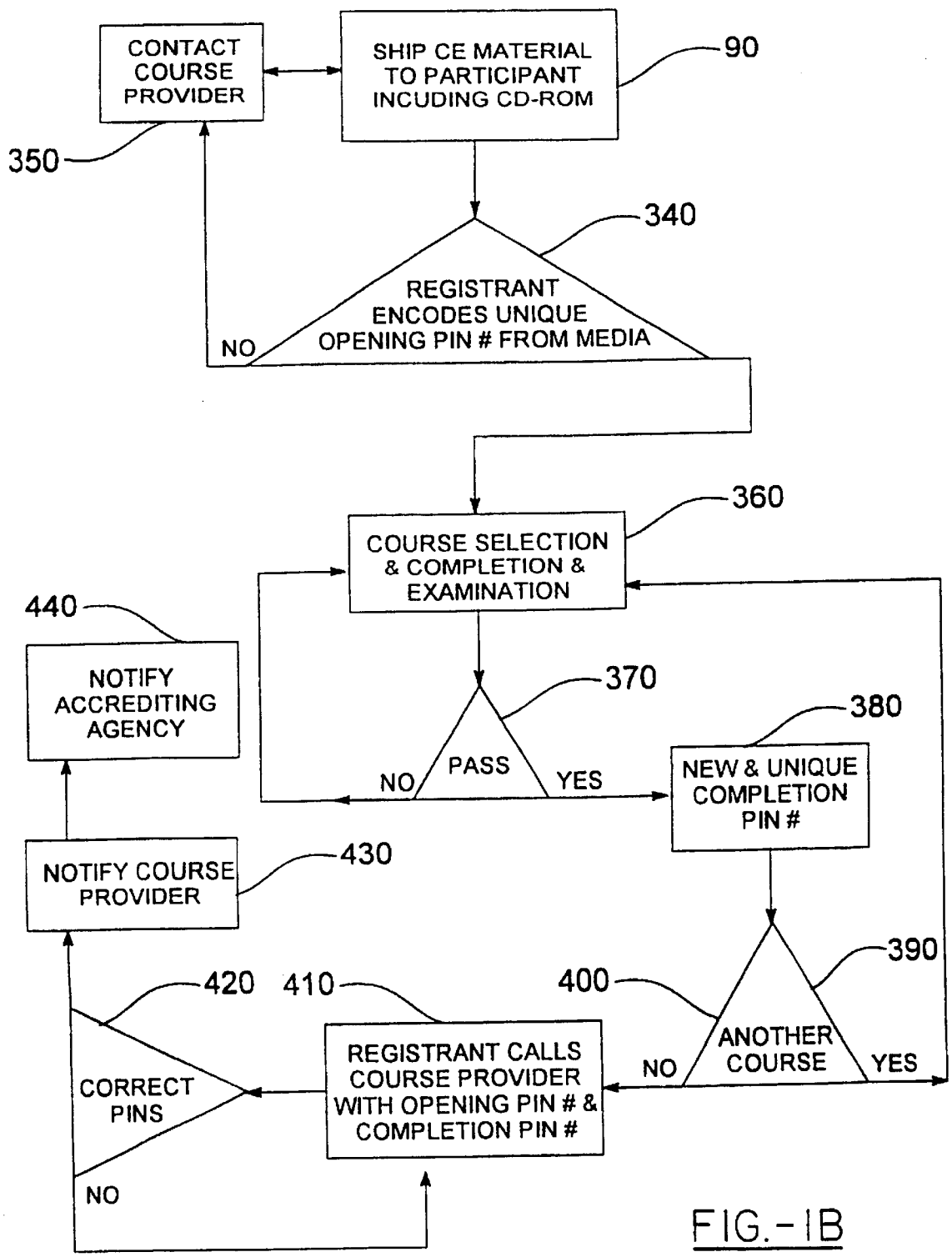
FIG. 1B is a flowchart of a CD-ROM variation of the product.

In still another embodiment of the invention, a CD-ROM is used to perform the task of verifying a registrant's identify and/or auditing actual comprehension and participation in continuing education courses. As shown in FIG. 1B, text-based program content is delivered on CD-ROM(s) 90 to the registrant's home or office following telephone/fax course registration 350. Multiple continuing education courses are available on the media, the number being dependent upon the amount of text and graphics and/or video content, enabling a registrant to complete as many courses as desired. The media is labeled with a unique beginning "pin-number" 340 that was generated at the time of registration 350. It is the responsibility of the registrant to correctly encode that number to initiate the CD-ROM based instruction. After the pin-number is successfully encoded, the registrant selects a course 360 and begins content study. After completion of the study process, the registrant encodes responses to questions randomly generated from a test bask that relates to the curriculum content 370. Correct responses to questions must be encoded in order to achieve mastery status as determined by the accrediting agency. Upon achieving mastery of the subject, a unique completion "pin-number" 380 is generated and visually displayed for the registrant to manually record. Unique completion "pin-numbers" are generated and displayed for each mastered course which is engaged by the participant 390. At the end of the instruction as determined by the participant 400, the registrant calls a telephone number to the course supplier, and when prompted, provides the beginning "pin-number" and all subsequent completion "pin-numbers" for each course taken 410. Credit is issued to registrants who prove successful course mastery by providing the correct/corresponding completion "pin-number" for each completed course 420. The course provider notifies the accrediting agency 430 which issues appropriate notification to the participant/registrant 440.

DVD-ROM Version

Figure 1C:
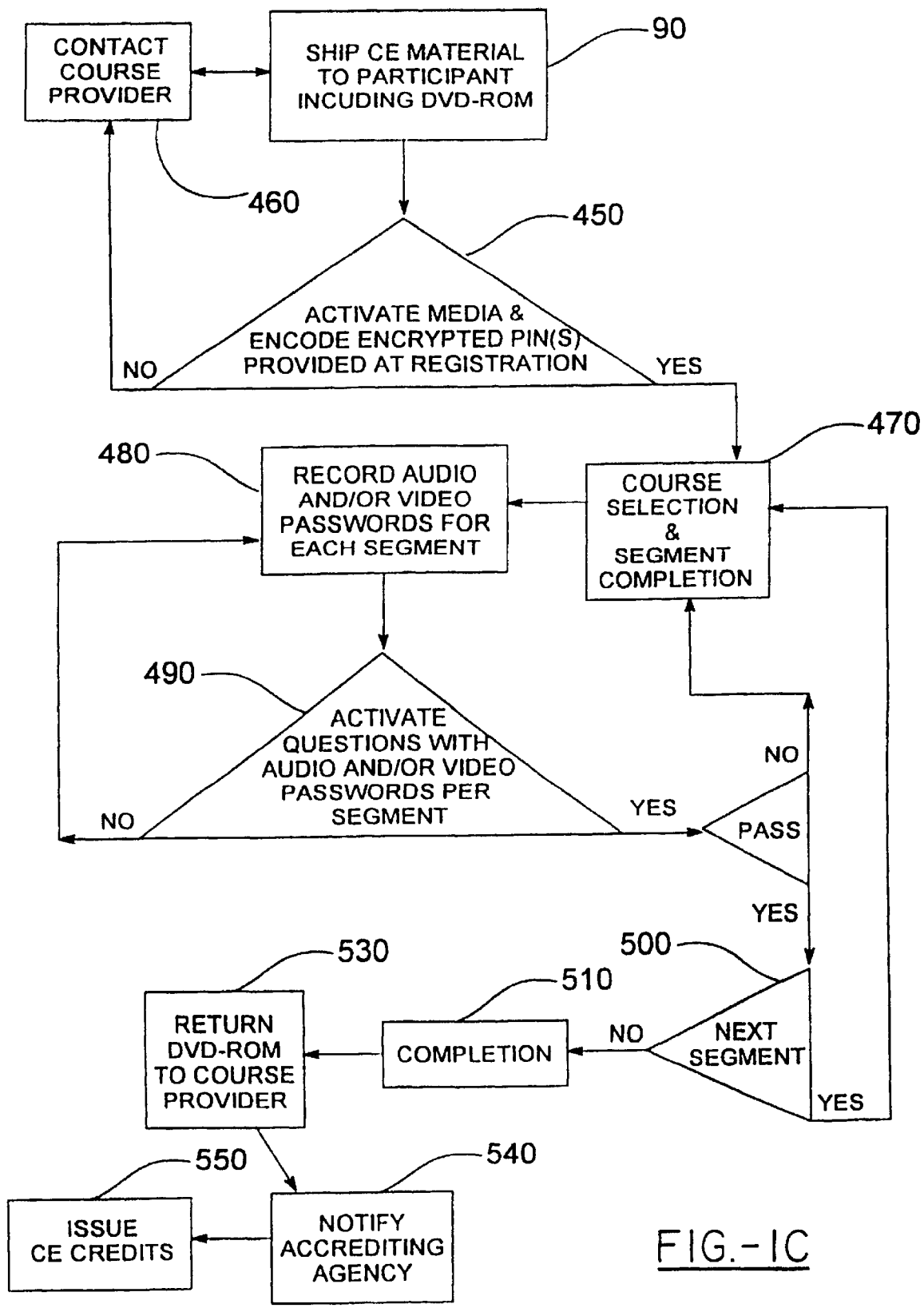
FIG. 1C is a flowchart of a DVD-ROM variation of the product.

In still yet another embodiment of the invention, a DVD-ROM is used to perform the task of verifying a registrant's identify and/or auditing actual comprehension and participation in continuing education courses. As shown in FIG. 1C, text with video program content is delivered on DVD-ROM(s) 90 to the registrant's home or office following telephone/fax course registration 460. Multiple continuing education courses are available on the media, the number being dependent upon the amount of text and graphics and/or video content, enabling a registrant to complete as many courses as desired. The media is labeled with a unique beginning "pin-number" 450 that was generated at the time of registration 460. It is the responsibility of the registrant to correctly encode that number to initiate the DVD-ROM based instruction. After the pin-number is successfully encoded, the registrant selects a course 470 and begins content study. During each course segment, audio, and/or video password(s) associated with each viewing segment are either spoken or displayed and manually recorded by the course participant 480. After completion of the study process, the registrant encodes responses to questions randomly generated from a test bank that relates to the curriculum content 490 after having correctly encoding the audio and/or video password(s). Correct responses to questions must be encoded in order to achieve mastery status as determined by the accrediting agency. In a manner analogous to FIG. 1, the participant may continue instructional viewing with a subsequent segment 500 or may postpone further instructional activity until a later time 520. Upon completion of the viewing segments 510, the course registrant will return the DVD-ROM to the course provider 530 who will contact the accrediting agency 540 who will ultimately issue appropriate credits pertinent to the agency requirements 550.

VCR & Camera Version

Figure 1D:
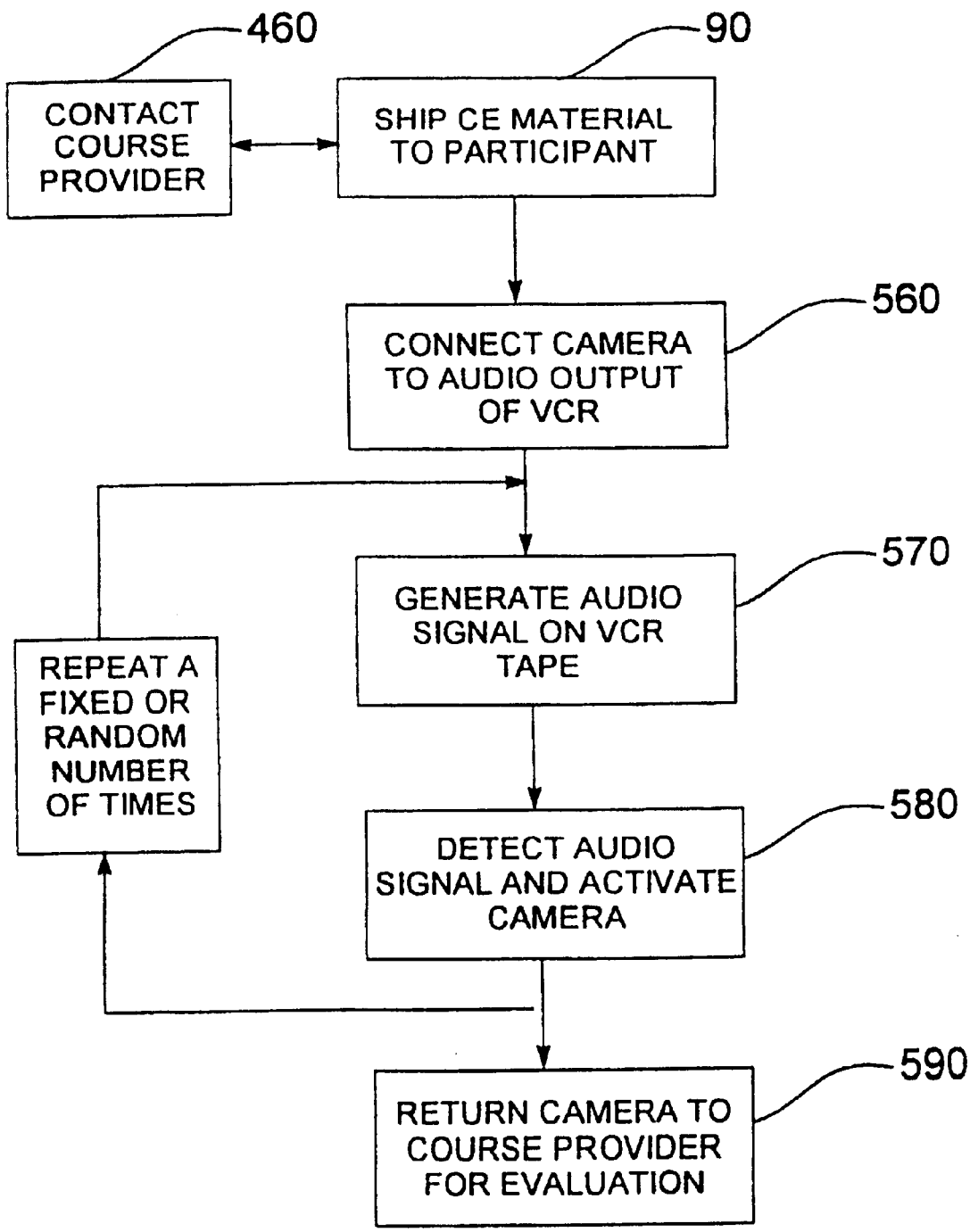
FIG. 1D is a flowchart of a video and photographic variation of the product.

In a further embodiment of the invention shown in FIG. 1D, the identify of the registrant and his participation in the course is provided by a linkage between the tape player (or subsequent device) and a camera. The device is connected to the audio output of the VCR and to the shutter control of the camera. The camera must be capable of date/time stamping of the generated images.

The first portion of the program must allow the registrant to verify the proper operation of the camera 560. The registrant will be informed that a picture (image) will be taken and that if it does not occur successfully, then a problem exists which must be resolved prior to continuing with the education material viewing.

Audio signals are recorded onto the audio track of the videotaped course 570. These inaudible signals are randomly distributed throughout the videotaped course content. These signals are used as a triggering mechanism. The use of these audio signals proves the program was running at the time the picture (image) was taken by the camera. Upon detection 580 of the proper audio code, the device activates the camera shutter, taking a picture of the registrant and simultaneously date/time stamping it. Following course completion, the camera and course materials are returned to the course provider for verification, content assessment and program evaluation. The pictures (images) are printed and delivered to the accrediting agency or other provider with results of the content material assessment as proof of the registrant's participation.

In yet another alternative embodiment of the invention, a video camera is mounted above a standard video monitor as well as "real-time" audio software which provides and facilitates live two-way telephone conversations. The course materials are viewed on the computer display from appropriate media (e.g., DVD-ROM or equivalent) supplied in the materials provided by the course provider. Participation is monitored by the video camera in a "real-time" environment with either a randomized or predetermined number of images taken of the participant and recorded onto a media device. Responses to a unique sampling of test bank questions generated from the media are keyed in on the computer and simultaneously recorded onto the media device. The media device is then returned to the course provided for evaluation, verification and course credit valuation processing.

Internet Website Version

Figure 1E:
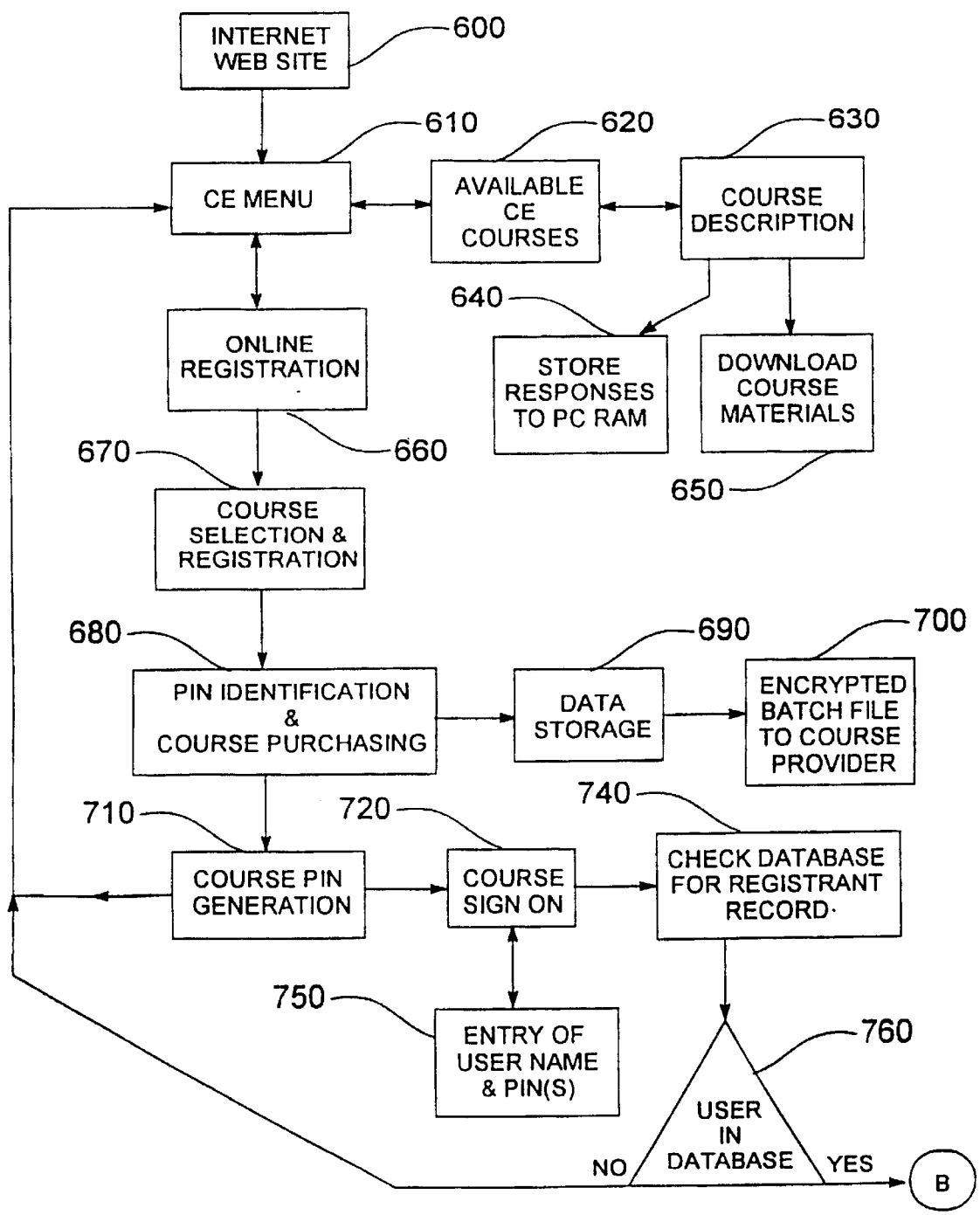
FIG. 1E is a first flowchart of an Internet variation of the product.

In still yet another alternative embodiment of the invention shown in FIG. 1E, the computer system of the participant is used to electronically link to the course provider's web site on the Internet. In this mode, the registrant will log onto the Internet via an Internet Service Provider (ISP) and access a web page by either an accrediting agency or course provider 600 by a Universal Resource Locator (URL) address. In order to effect the continuing education purposes, a menu of available courses 610 will be displayed as well as an ability to register and activate the course. Available courses are added to a "shopping cart" 620 wherein further course description is available 630 to aid in the participant course selection process. The materials are stored locally to PC RAM (random access memory) 640 with the capability of downloading and printing course materials 650. After course selection has occurred, an online registration 660 sequence is available for the participant. From the selected courses 670, a personal identification and course purchasing record is generated which contains various bibliographic and personal identifiers as discussed previously 680. This material is stored on a registration server 690 and an encrypted batch file obtained by the course provider 700. After completion of the registration process 710, a "pin" number is generated with the option of either returning to the main menu 610 or proceeding to begin the course 720.

Figure 1F:
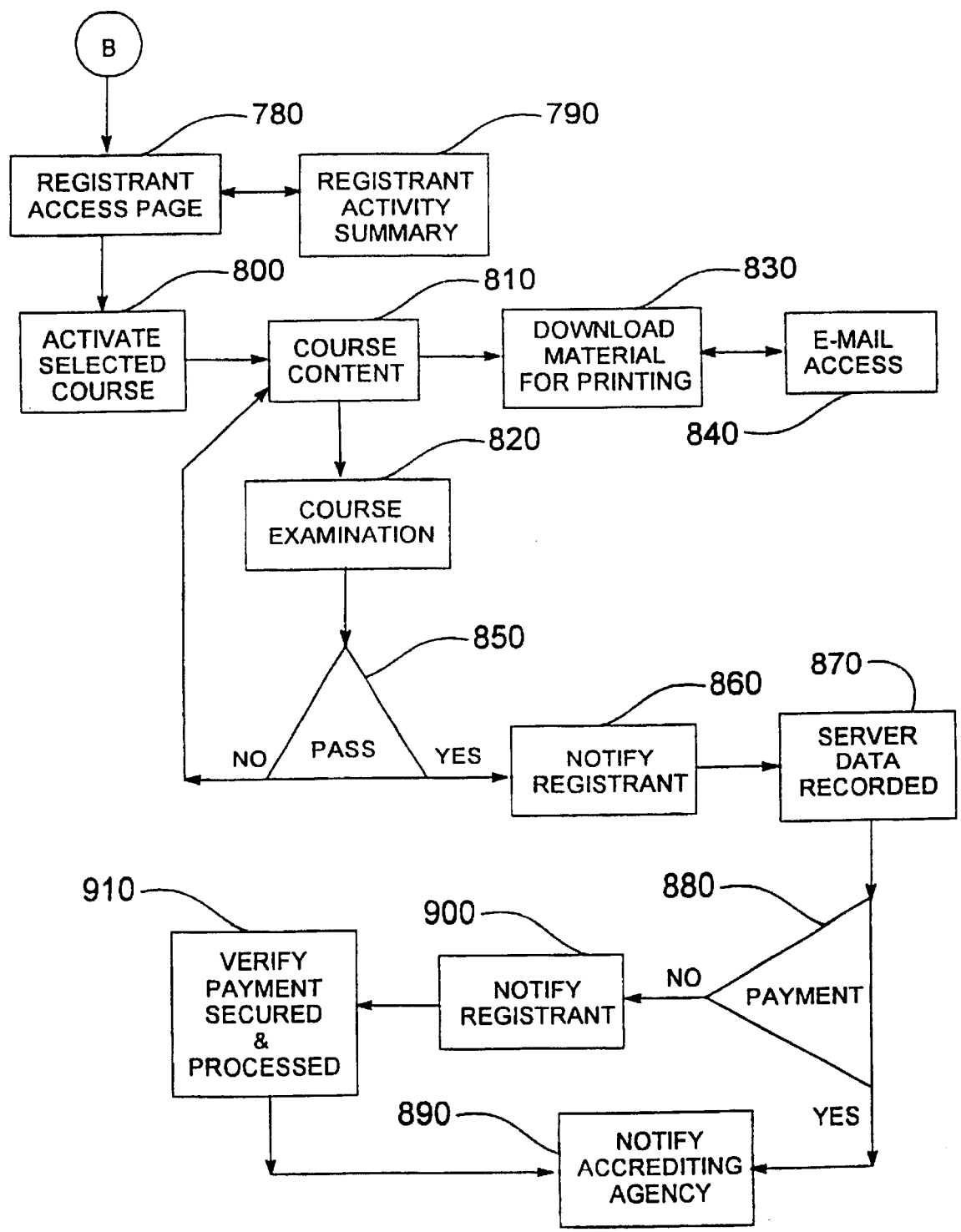
FIG. 1F is a continuation of the flowchart of FIG. 1E.

If the proceed option is elected, then the database is checked for the registrant's record 740 followed by course sign on consisting of the identification of the participant (name) and assigned "pin" number 750. If a mis-match is detected, then the user is placed back to the main menu 610 However, if a match is found 760, then the registrant is permitted to review the access web page 780 with links to the course and personal information 780 as seen in FIG. 1F. Upon activation of the selected course 800, the material 810 is downloaded 830 in a format suitable for printing, e.g., PDF format, capable of being read by for example, by Acrobat Reader, a shareware product. An optional neuron plugin is available for electronic mail and Internet access 840, the neuron plugin being an enhancement to a browser, e.g., Netscape®, which is a "run-time" version of a management software product by Asymetric® Toolbook. The neuron plugin allows an end-user to download a course to a hard drive for viewing off-line at a later time. This plugin additionally allows the end-user to directly link to the Internet where all assessment and testing is performed in an on-line environment. After reviewing the course content, the applicant moves to the testing phase to determine the mastery of the subject matter 820. In a manner analogous to that described previously, various questions are answered 850 with subsequent grading 860 and data archived 870. The course provider may cross-check for registrant payment 880 with notification of the accrediting agency 890. If a problem exists with the payment of the course, the registrant is notified 900 by E-mail, form letter, fax, etc., which if resolved in an appropriate manner 910, will result in the notification of the accrediting agency 890.

This invention has been described in detail with reference to specific embodiments thereof, including the respective best modes for carrying out each embodiment. It shall be understood that these illustrations are by way of example and not by way of limitation.

What is claimed is:

1. A process which comprises the steps of:
    encoding at least one personal identifier onto a user interface media;
    displaying a prompt on said user interface media for the at least one personal identifier which requires a match of the at least one personal identifier encoded on the user interface media;

encoding at least one password onto a data storage media;

encoding the at least one password from the data storage media onto the user interface media; and displaying a prompt on the user interface media for entering the at least one password which requires a match of the at least one password from the data storage media with the at least one password encoded on the user interface media.

2. The process of claim 1, wherein
the user interface media is a removable magnetic disk drive.

3. The process of claim 1 wherein the at least one password on the data storage media comprises a password selected from the group consisting of audio passwords, visual passwords and combinations thereof.

4. The process of claim 1 which further comprises
recording an audio response onto an audio cassette.

5. The process of claim 1 which further comprises
taking at least one image of a viewer of the system.

6. The process of claim 5 wherein the at least one image is stored on a storage medium selected from the group consisting of a film, the interfacing media and the viewable media.

7. The process of claim 1, wherein the data storage media is selected from the group consisting of video cassettes, audio cassettes, CD-ROMs, DVD-ROMs and sites on a global computer network.

8. The process of claim 1 further comprising:
storing a plurality of questions pertinent to a subject matter of the data storage media on the user interface media;

displaying at least one question of the plurality of questions on the user interface media;

displaying a prompt for entering an answer to said at least one question;

storing an answer to said at least one question; and comparing said entered answer to said stored answer.

9. The process of claim 8 wherein the step of storing further comprises:
selecting a random base key;
generating at least one encrypted key from the base key; and
encrypting each question using the at least one encrypted key.

10. The process of claim 9 wherein the step of encrypting further comprises:
using a different encrypted key for each question.

11. The process of claim 9 wherein
the step of selecting a base key comprises selecting a random numeric value of at least two digits.

12. The process of claim 11 wherein
the step of generating at least one encrypted key from the base key uses a mathematical formula which includes at least one personal identifier.

13. The process of claim 12 wherein
the step of generating at least one computed key from the base key uses a mathematical formula which further includes at least a software version number.

14. The process of claim 11 wherein
the step of generating at least one encrypted key from the base key uses a mathematical formula which includes at least one variable which is selected from the group consisting of question number, section number, date-created, social security number, credit card number and credit card expiration date.

15. The process of claim 9 wherein
a base encryption key, an encryption scheme identification and the at least one personal identifier are encrypted using an encryption algorithm using the starting key and written in data files on a magnetic disk.

16. The process of claim 15 wherein
the magnetic disk further comprises
an encrypted question database,
an encrypted answer key, and
an encrypted number of required correct responses.

17. The process of claim 16 wherein
subsequent to achieving the required correct responses, a section of the question database is marked as passed and inaccessible to a user.

18. The process of 17 wherein
subsequent to the section of the question database being marked as passed, an entry is made on the magnetic media indicating at least a date and a time of completion.

19. A process for verifying that a user is attentive to an entire course of study comprising:
developing a defined length course of study and affixing said course of study to a tangible medium;
generating a set of pass codes;
inserting said pass codes at random locations throughout said defined length of said course of study;
requiring said user to collect said pass codes; and
evaluating users collection of pass codes.

20. The process as recited in claim 19 further comprising:
providing credit to said user based on user's ability to correctly collect a defined number of pass codes.

21. The process as recited in claim 19 wherein said set of pass codes is generated for a group of users.

22. The process as recited in claim 19 wherein said set of pass codes is generated for an individual user.

23. The process as recited in claim 19 wherein said set of pass codes is unique for every user.

24. The process as recited in claim 19 further comprising the steps of:
encoding identification information for a user onto a media;
requiring said user to enter said pass codes onto said media containing said user identification information.

25. The process as recited in claim 24 wherein said media is capable of interfacing with a computer.

26. The process as recited in claim 19 wherein said tangible medium contains an audio component and a video component.

27. The process as recited in claim 26 wherein one or more of said pass codes are contained in said audio component.

28. The process as recited in claim 19 wherein said tangible medium is selected from the group consisting of video cassettes, audio cassettes, compact discs, digital versatile discs, and sites on a global informational network.

29. The process as recited in claim 19 further comprising:
generating a set of questions pertaining to the subject matter of said course of study.

30. The process as recited in claim 29 further comprising:
providing credit to said user when a predetermined number of correct responses to said set of questions have been provided.

31. The process as recited in claim 19 further comprising:

dividing said course of study into a plurality of segments;

inserting a first pass code from said set of pass codes in a random location in a first segment of said course of study;

requiring said user to collect said first pass code;

requiring said user to enter said first pass code to view a set of questions pertaining to the subject matter of said first segment of said course of study.

32. The process as recited in claim 31 further comprising:

generating a second pass code after a predefined number of correct responses have been entered in response to said set of questions pertaining to the subject matter of said first segment of said course of study; and displaying said second pass code.

33. The process as recited in claim 32 further comprising:

requiring said user to enter said second pass code to view a set of questions pertaining to the subject matter of a second segment of said course of study.

34. The process as recited in claim 31 further comprising:

inserting a second pass code from said set of pass codes in a random location in a second segment of said course of study;

requiring said user to collect said second pass code; and requiring said user to enter said second pass code to view a set of questions pertaining to the subject matter of said second segment of said course of study.

35. A process for verifying that a user is attentive to an entire course of study comprising:

developing a defined length course of study;

affixing said course of study to a tangible medium;

dividing said course of study into a plurality of segments;

generating a plurality of pass codes;

inserting at least one pass code into each of said plurality of segments;

requiring said user to collect said pass codes; and requiring said user to enter said at least one pass code from each of said plurality of segments to view a set of questions pertaining to the subject matter of each of said segments.

* * * * *